United States Patent [19]
Fiat

[11] Patent Number: 5,592,552
[45] Date of Patent: Jan. 7, 1997

[54] BROADCAST ENCRYPTION

[75] Inventor: Amos Fiat, Tel Aviv, Israel

[73] Assignee: Algorithmic Research Ltd., Givat Shmuel, Israel

[21] Appl. No.: 295,207

[22] Filed: Sep. 24, 1994

[30] Foreign Application Priority Data

Aug. 25, 1993 [IL] Israel ......................................... 106796

[51] Int. Cl.$^6$ .............................................. H04L 9/00
[52] U.S. Cl. ................................. 380/21; 380/20; 380/23
[58] Field of Search ................................. 380/21, 20, 23, 380/10

[56] References Cited

U.S. PATENT DOCUMENTS

| | | | |
|---|---|---|---|
| 5,208,859 | 5/1993 | Bartucci et al. | 380/21 |
| 5,481,609 | 1/1996 | Cohen et al. | 380/21 |
| 5,481,613 | 1/1996 | Ford et al. | 380/21 |

OTHER PUBLICATIONS

Goldreich, O., et al., How to construct random functions, *Journal of the Association for Computing Machinery*, vol. 33, No. 4, 1986, pp. 792–807.
Fredman, M. L., et al., Storing a sparse table with O(1) worst case access time, *Journal of the Association for Computing Machinery*, vol. 31, No. 3, Jul. 1984, pp. 538–544.
Carter, J. L., et al., Universal classes of hash functions, *Journal of Computer and System Sciences*, 18, 143–154, (1979).
Rivest, R. L., et al., A method for obtaining digital signature and public–key cryptosystems, *Communications of the ACM*, V 21, N 2, Feb. 1978, pp. 120–126.
Impagliazzo, R., et al., Pseudo–random generation from one–way functions (extended abstract), 1989.
Diffie, W., et al., New directions in cryptography, *IEEE Transactions on Information Theory*, V IT–22, N 6, Nov. 1976, pp. 644–654.
Wegman, M. N., et al., New hash functions and their use in authentication and set equality, *Journal of Computer and Syste Sciences*, 22, pp. 265–279, 1981.
Shamir, A., On the generation of cryptographically strong pseudorandom sequences, *ACM Transactions on Computer Systems*, vol. 7, No. 1, Feb. 1983, pp. 38–44.
Fiat, A., et al., Broadcast encryption, *Advances in Cryptology CRYPTO '93*, Aug. 1993, pp. 480–491.

*Primary Examiner*—David C. Cain
*Attorney, Agent, or Firm*— Ladas & Parry

[57] ABSTRACT

A selective broadcasting method operative to transmit a plurality of message data signals to a corresponding plurality of subscriber subsets within a set of subscribers, the method comprising receiving an indication of a privileged set comprising an individual subset and transmitting a message data signal from which a key can be extracted by members of the privileged set and cannot be extracted by any set of members outside the privileged set whose number of members is less than a predetermined resiliency, wherein the length of the message data signal is less than the sum of lengths of the message data signals required if an individual message data signal is transmitted to each subscriber in the privileged set.

20 Claims, 5 Drawing Sheets

BROADCAST ENCRYPTION

FIELD OF THE INVENTION

The present invention relates to apparatus and methods for selective communications generally and more particularly to apparatus and methods for selective broadcasting of television signals.

BACKGROUND OF THE INVENTION

State of the art broadcast encryption methods are described in the following publications, the disclosures of which are hereby incorporated by reference:

N. Alon and J. Spencer, The Probabilistic Method, Wiley, 1992;

J. L. Carter and M. N. Wegman, *Universal Classes of Hash Functions*, Journal of Computer and System Sciences 18 (1979), pp. 143–154;

W. Diffie and M. Hellman, *New Directions in Cryptography*, IEEE Trans. on Information Theory, vol. IT-22, 6 (1976), pp. 644–654;

M. L. Fredman, J. Komlós and E. Szemerédi, *Storing a Sparse Table with O(1) Worst Case Access Time*, Journal of the ACM, Vol 31, 1984, pp. 538–544;

O. Goldreich, S. Goldwasser and S. Micali, *How to Construct Random Functions Journal* of the ACM 33, 1986;

R. Impagliazzo, L. Levin and M. Luby, *Pseudo-random Generation given from a One-way Function*, Proc. of the 20th ACM Symp. on Theory of Computing, 1989;

K. Mehlhorn, Data Structures and Algorithms: Sorting and Searching, Springer-Verlag, Berlin Heidelberg, 1984;

R. Rivest, A. Shamir and L. Adleman, *A Method for Obtaining Digital Signature and Public Key Cryptosystems*, Comm. of ACM, 21 (1978), pp. 120–126;

A. Shamir, *On the Generation of Cryptographically Strong Pseudo-Random Number Sequences*, ACM Trans. Comput. Sys., 1 (1983), pp. 38–44; and M. N. Wegman and J. L. Carter, *New Hash Functions and Their Use in Authentication and Set Equality*, Journal of Computer and System Sciences 22, pp. 265–279 (1981).

SUMMARY OF THE INVENTION

The present invention seeks to provide a central broadcast site which broadcasts secure transmissions to an arbitrary set of recipients while minimizing key management related transmissions. Several methods are described that allow a center to broadcast a secret to any set of privileged users out of a universe of size n so that coalitions of k users not in the privileged set cannot learn the secret. In the preferred embodiment of the present invention, each user stores $O(k \log k \log n)$ keys and the center broadcasts $O(k^2 \log^2 k \log n)$ messages regardless of the size of the privileged set. This embodiment is resilient to any coalition of k users. Another embodiment described herein is resilient with probability p against a random subset of k users. Each user stores $O(\log k \log(1/p))$ keys and the center broadcasts $O(k \log^2 k \log(1/p))$ messages.

The present invention also seeks to provide an improved system for selective broadcasting of television signals, including conventional aerial broadcasting and broadcasting via cable and/or satellite.

The present invention also seeks to provide an improved system for selective communications generally.

The present invention also seeks to provide a system for pay-per-view that has very low communications requirements, yet allows very significant security. A pay-per-view system that requires only a constant number of bits per user, does not require any significant assumptions on the hardware security, yet makes piracy almost impossible.

BRIEF DESCRIPTION OF THE DRAWINGS

The present invention will be understood and appreciated from the following detailed description, taken in conjunction with the drawings in which.

DETAILED DESCRIPTION OF PREFERRED EMBODIMENTS

Figure 1:
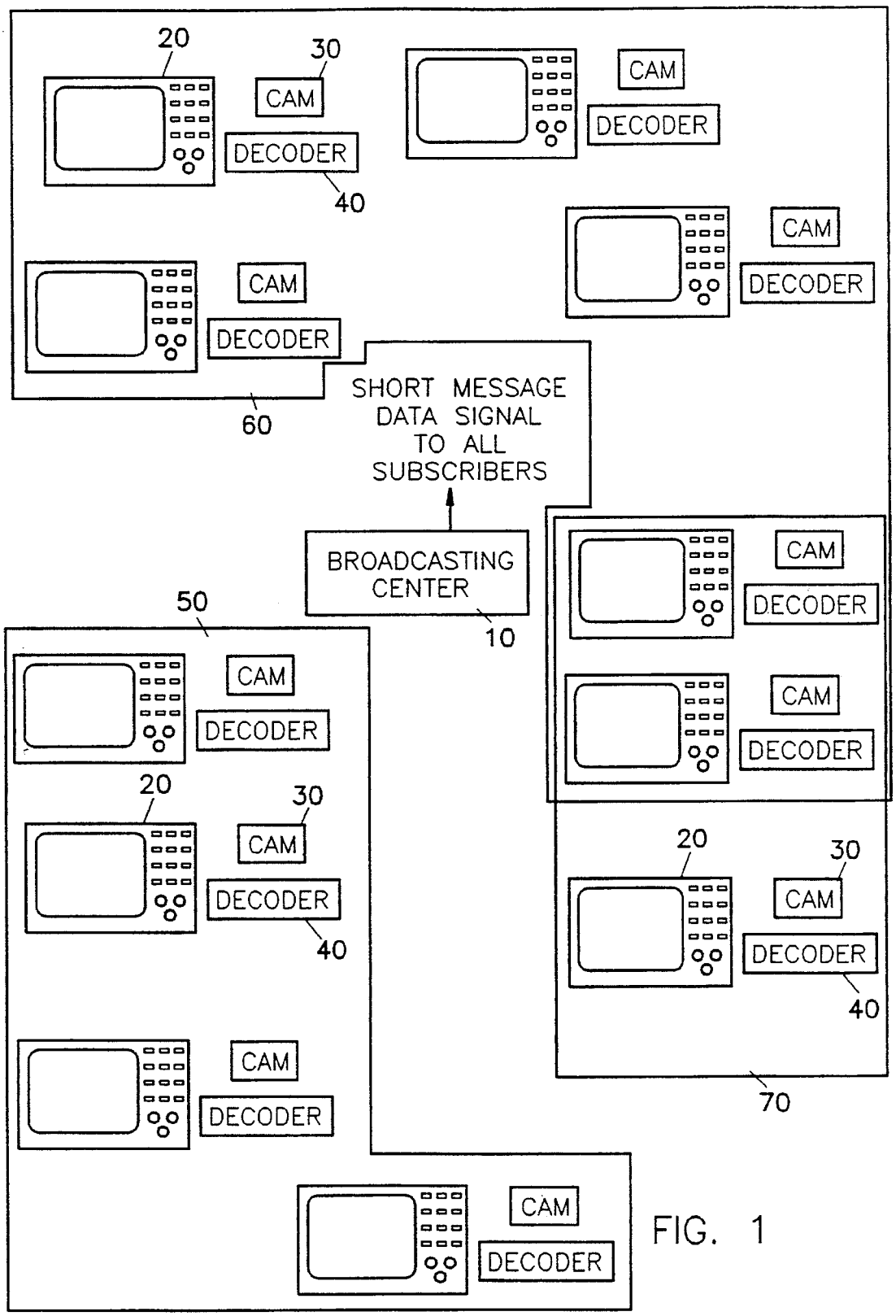
FIG. 1 is a generalized block diagram of a selective broadcasting system which may be operated in accordance with any of the methods of FIGS. 2–5.

In broadcast encryptions, there is a center and a set of users. The center may provide the users with prearranged keys when they join the system. At some point the center may wish to broadcast a message (e.g. a key to decipher a video clip) to a dynamically changing privileged set of the users in such a way that non-members of the privileged class cannot learn the message. Naturally, the non-members are curious about the contents of the message that is being broadcast, and may try to learn it.

One method is to give each user its own key and transmit an individually encrypted message to each member of the privileged class. This requires a very long transmission (the number of members in the class times the length of the message). Another method is to provide each possible subset of users with a key, i.e. give every user the keys corresponding to the subsets it belongs to. This requires every user to store a huge number of keys.

The present invention seeks to provide implementations which are efficient in both measures, i.e. transmission length and storage at the user's end, based on schemes which are computationally efficient.

A scheme is considered broken if a user that does not belong to the privileged class can read the transmission. Preferably, the System is resilient to any subset of k users that collude and any (disjoint) set (of any size) of privileged users, where k is a predetermined integer.

The random-resiliency of a system or scheme refers to the expected number of users, chosen uniformly at random, that have to collide so as to break the system or scheme.

In many applications, it suffices to consider only the weaker random-resiliency measure. For example, if decryption devices are captured from random users, or were assigned at random to users, it is the random resiliency that determines how many devices need be captured so as to break the scheme.

The present invention seeks to securely transmit a message to all members of the privileged subset. If cryptographic tools such as one-way functions exist then this problem can be translated into the problem of obtaining a common key. The security parameter is defined as the length of this key.

A broadcast scheme allocates keys to users so that given a subset T of a population U of n subscribers, the center can broadcast messages to all users following which all members of T have a common key.

A broadcast scheme or system is termed herein resilient to a set S if for every subset T that does not intersect with S, no eavesdropper, that has all secrets associated with members of S, can obtain the secret common to T. The requirement that no adversary can obtain the secret can be related to the requirement that no adversary that is computationally bounded by probabilistic polynomial time can obtain the key with non-negligible probability (i.e. greater than inverse polynomial).

A scheme or system is called k-resilient if it is resilient to any set $S \subset U$ of size k. A scheme or system is called (k,p)-random-resilient if with probability at least 1−p the scheme or system is resilient to a set S of size k, chosen at random from U. n and |U| are used interchangeably hereinafter.

The "resources" to be optimized are the number of keys associated with each user, the number of transmissions used by the center, and the computation effort involved in retrieving the common key by the members of the privileged class.

Depending on the resiliency required, the present invention offers a tradeoff between two relevant resources: memory per user and transmission length.

If nothing is known about the privileged set T, any broadcasting system requires that the transmission be sufficiently long to uniquely identify the privilege subset T. Otherwise, there would be two non-identical sets, T and T', both of which somehow manage to obtain the same common key. Thus, in general, simply representing a subset $T \subset U$ requires |U| bits. Using the methods shown and described herein, transmitting an additional o(|U|) bits guarantees security against all coalitions of size $O(\sqrt{|U|})$ users and randomly chosen coalitions of O(|U|) users. The computational and memory requirements for these schemes are $O(\sqrt{U})$. In other words, in some sense, security is available for "free".

In many applications the privileged set may be identified by sending a relatively short transmission, for example if the set can be computed from an old privileged set or the set representation can be compressed. Thus, it is possible to distinguish between the set identification transmission and a broadcast encryption transmission. According to the present invention, in general, the center identifies each user with a unique identification number, and thus the set representation is a bit vector. Preferably, the identification numbers are assigned at random to new users, as described in detail below.

The methods described herein include zero-message systems and more general systems. Zero-message systems have the property that knowing thee privileged set T suffices for all users $\chi \in T$ to compute a common key with the center without any transmission. To actually use a zero-message scheme to transmit information implies using this key to encrypt the data transmitted.

More general systems may require that the center transmit many messages. All the systems described herein require that the length of the center generated messages be equal to a predetermined security parameter such as the size of the encryption key. Thus, when counting messages transmitted by the center, each message is s bits in length, where s is the security parameter.

According to a preferred embodiment of the present invention, low resiliency zero-message systems are used to construct higher resiliency schemes which are not zero-message type systems.

For low resiliency systems, assumption-free constructions may be employed that are based upon no cryptographic assumption (the equivalent of a one-time pad). However, more efficient systems may be employed which are based upon some cryptographic assumptions, either the existence of a one way function or the more explicit assumption that RSA is secure.

The construction of systems of high resiliency is described in terms of the number of "levels" involved in construction. The levels refer to X sets of hash functions that partition and group users in a variety of ways.

To obtain a resiliency of k, it suffices to store k log k log n keys per user, while the number of messages transmitted by the center is $O(k^2 \log^2 k \log n)$. To obtain a random resiliency of k, with probability p, it suffices to store log k log(1/p) keys per user, while the number of messages transmitted by the center is O(k log k log(1/p)). The tradeoff between memory and transmission length is discussed in more detail below.

Several "zero message" systems are now described that do not require the center to broadcast any message in order for the member of the privileged class to generate a common key. These systems may be employed as building blocks for the low memory k-resilient systems described below.

A basic system is now described which allows users to determine a common key for every subset, resilient to any set $S \subset U$ of size $\leq k$.

For every set $B \subset U$, $0 \leq |B| \leq k$, a key $K_B$ is given to every user $\chi \in U - B$. The common key to the privileged set T is the exclusive or of all keys $K_B$, $B \subset U-T$. Any coalition $S \subset U$ having $|S| \leq k$ users will be missing key $K_S$ and will therefore be unable to compute the common key for any privileged set T such that $S \cap T$ is empty.

The memory requirements are that every user is assigned $$\sum_{i=0}^{k} \binom{n}{k}$$

keys.

This provides a k-resilient system that requires each user to store $$\sum_{i=0}^{k} \binom{n}{k}$$

keys and the center need not broadcast any message in order to generate a common key to the privileged class.

Two 1-resilient systems using cryptographic assumptions are now described. The memory requirements of the system described above may be improved using cryptographic assumptions such as "one-way functions exist" and that extracting prime roots modulo a composite is hard. The improvements are applicable to any k, however they are the most dramatic for k=1.

A 1-resilient system based on one-way functions is first described. The 1-resilient version of the system described above requires every user to store n+1 different keys. However, this can be reduced to O(log n) keys per user if the keys are pseudo-randomly generated from a common seed where the pseudo-random function f output is twice the length of the input, as described below. It is assumed that one-way functions exist and hence pseudo-random generators exist, as described in the above-referenced Impagliazzo et al. publication. Key distribution may be carried out as follows: the n users are associated with the leaves of a balanced binary tree on n nodes. The root is labeled with the common seed and other vertices are labeled recursively as follows: the function f is applied to the root label. The left half of the function value is the label of the root of the right subtree while the right half of the function value is the label of the root of the left subtree. This is similar to the construction of the tree in the generation of a pseudo-random function in the above-referenced Goldreich et al. publication.

By the scheme described above, every user $\chi$ should get all the keys except the one associated with the singleton set B={$\chi$}. To ensure this, the path extending from the leaf associated with the user $\chi$ to the root is removed. A forest of O(log n) trees remains and the user $\chi$ is given the labels associated with the roots of these trees. The user can compute all leaf labels, except $K_B$, without additional help. In other words, if one-way functions exist, the above method provides a 1-resilient scheme that requires each user to store log n keys wherein the center need not broadcast any message in order to generate a common key to the privileged class.

A 1-resilient system based on Computational Number Theoretic Assumptions is now described.

A specific number theoretic system, cryptographically equivalent to the problem of root extraction modulo a composite, can further reduce the memory requirements for 1-resilient systems. This system is cryptographically equivalent to the RSA scheme described in Rivest et al. and employs the Diffie-Hellman key exchange mechanism described in the above-referenced Diffie-Hellman publication and the original Shamir cryptographically secure pseudo-random sequence described in the above-referenced Shamir publication. The center chooses a random hard to factor composite N=P·Q where P and Q are primes. It also chooses a secret value g of high index. User i is assigned key $g_i = g^{p_i}$, where $p_i, p_j$ are relatively prime for all i,j∈U. All users know what user index refers to what $p_i$. A common key for a privileged subset of users T is taken as the value $g_T = g^{\pi_{i \in T} p_i}$ mod N Every user i∈T can compute $g_T$ by evaluating $$g_i^{\pi_{j \in T-\{i\}} p_j} \mod N$$

If, for some T⊂U and some j∉T, user j could compute the common key for T, then the user could also compute g. Given $a^x$ mod N and $a^y$ mod N and $\chi$ and y the user could compute $a^{GCD(x,y)}$ mod N by performing a sequence of modular exponentiations/divisions on $a^x$ and $a^y$ as described in the above-referenced Shamir publication. Since the GCD of $p_j$ and $$\prod_{h \in T} p_h$$

is 1, g can be computed by user j in this manner. Thus, the user could compute the $p_j$'th root of $g^{p_j}$ while knowing only the composite N. If this is assumed to be hard, the scheme is 1-resilient.

In other words, if extracting root modulo composites is hard, the present invention provides a 1-resilient system that requires each user to store one key, of length proportional to the composite, and the center need not broadcast any message in order to generate a common key to the privileged class. The above system is not 2-resilient, since any two users can collude and compute g.

Low memory k-resilient systems are now described. The zero message k-resilient systems described herein require for k>1 a great deal of memory, exponential in k. Efficient constructions of k-resilient systems for k>1 are now described. The systems are based on a method of converting 1-resilient schemes into k-resilient systems. A 1-resilient system for any number of users is employed which may be the no-assumption system described above or any of the cryptographic assumption variants described above.

w is the number of keys that a user is required to store in the 1-resilient system. I.e w=n+1 if no cryptographic assumptions are made, w=log n if it is assumed that one-way functions exists and w=1 if we assume that it is hard to extract roots modulo a composite. The efficiency of the system described herein is measured by how many w's they require.

One level systems are described which are based on a family of functions $f_1, \ldots, f_l$, $f_i: U \rightarrow \{1, \ldots, m\}$, with the following property: For every subset S⊂U of size k, there exists some 1≤i≤l such that for all x,y∈S: $f_i(\chi) \neq f_i(y)$. This is equivalent to the statement that the family of functions $\{f_i\}$ contains a perfect hash function for all size k subsets of U when mapped to the range $\{1, \ldots, m\}$. Perfect hash functions are described in the above-referenced publications by Fredman et al. and Mehlhorn.

Such a family can be used to obtain a k-resilient system from a 1-resilient system. For every 1≤i≤l and 1≤j≤m an independent 1-resilient scheme R(i,j) is used. Every user $\chi \in U$ receives the keys associated with schemes $R(i,f_i(\chi))$ for all 1≤i≤l. In order to send a secret message M to a set T⊂U the center generates random strings $M^1, \ldots, M^l$ such that $$\oplus_{i=1}^{l} M^i = M.$$

The center broadcasts for all 1≤i≤l and 1≤j≤m the message $M^i$ to the privileged subset $\{\chi \in T | f_i(\chi) = j\}$ using scheme R(i,j). Each user $\chi \in T$ can obtain all the messages $M^1, \ldots M^l$ and by Xoring them get M.

The number of keys each user must store is m times the number needed in the 1-resilient scheme. The length of the transmission is l·m times the length of the transmission for a zero message 1-resilient scheme, equal to the security parameter.

In order for the system described above to be a k-resilient system, the values of m and l may be as follows: $m=2k^2$ and l=k log n. This can be seen via a probabilistic construction. Fix S⊂U of size k. The probability that a random $f_i$ is 1-1 on S is at least $$1 - \sum_{i=1}^{k-1} \frac{i}{2k^2} \geq \frac{3}{4}.$$

Therefore the probability that, for no i, $f_i$ is 1-1 on S is at most $\frac{1}{4}^l = 1/n^{2k}$. Hence the probability that for all subsets S⊂U of size k there is a 1-1 $f_i$ is at least $$1 - \binom{n}{k} \cdot \frac{1}{n^{2k}} \geq 1 - \frac{1}{n^k}.$$

Therefore, there exists a k-resilient scheme that requires each user to restore O(k log n·w) keys and the center to broadcast O(k³ log n) messages. Moreover, the scheme can be constructed effectively with arbitrarily high probability by increasing the scheme parameters appropriately.

Against a randomly chosen subset S⊂U of size k, a much more efficient system is as follows: For any 1≤k≤n and 0≤p≤1 a (k,p)-random-resilient scheme that requires each user to store O(log(1/p)·w) keys and the center to broadcast O(k² log(1/p)) messages is the scheme in which m=k² and l=logp. The scheme can be constructed effectively with arbitrarily high probability by increasing the scheme parameters appropriately.

Explicit constructions for the family $f_1, \ldots f_l$, appear to be at least a factor of k more expensive. For example, the family $F=\{f_p(\chi)=\chi \bmod p | p \leq k^2 \log n \text{ and is a prime}\}$ satisfies the above requirement.

The number of keys stored per user in this explicit construction is O(k² log n/log log n) and the number of messages that the center broadcasts is O(k⁴ log² n/log log n).

The foregoing remarks regarding function representing storage reduction, and adversary limitations and resiliency are applicable to both single and multi level schemes:

In some applications using probabilistic constructions is problematic because storing the resulting structure may be prohibitively expensive. However, the systems described above do not absolutely require that the $f_i$ functions be computable and so the user could simply be assigned $f_i(\chi)$, which could be chosen at random. The center could in fact generate all required functions from a pseudo-random function and a single seed.

Alternatively, instead of using completely random functions, log k-wise independent functions may be employed such as degree log k polynomials. The above discussion of probabilistic construction is still generally applicable. The advantage is that a succinct representation for the functions is provided. Storing such function representations in user decryption devices is not much more expensive than storing the keys required in the above schemes.

It is sometimes desirable to limit the number of keys that a user must store, at the expense of the number of keys that the center must broadcast. A tradeoff is obtainable if, instead of hashing to a range of size 2 k² hashing is performed to a range of size m=α·k². As a result, the memory requirements are smaller by a log α factor and the broadcast, requirements are larger by a factor of α, for both k-resilient schemes and (k,p)-random-resilient schemes.

Another tradeoff that may reduce storage requirements is as follows: All of the R(i,j) systems above deal with a subset of users. If the $f_i$ functions can be computed by anyone (e.g., k-wise independent functions as described above), then the R(i,j) 1-resilient systems can be devised so as to deal with the true number of users associated with the system, depending on the underlying 1-resilient scheme. This leads to a saving in memory requirements at the expense of some additional computation.

A k-resilient system is resilient to any coalition of size k. This means that irrespective of how the adversary goes about choosing the coalition, no coalition of size smaller than k will be of any use to the adversary. However, the system is resilient to many sets of size much larger than k.

The adversary may capture devices at random. In this case the random resiliency measure is directly applicable. Given a (V, ½) randomized resilient system, the expected number of devices that the adversary must capture to break the scheme is at least V/2.

In some applications, the user of the decryption device does not even know his unique index amongst all users. For example, the user index and all user secrets could be stored on a relatively secure smartcard, such as a smartcard which is vulnerable but not to a casual user. Thus, if user indices are assigned at random, any set of devices captured will be a random set irrespective of the adversary strategy used.

In the definition of (k,p) random resiliency, the probability p is an absolute probability, which is not reasonable if the underlying one resilient schemes employed can be themselves broken with relatively high probability, as by guessing the short secret keys. Also, the assignment of user ID (index numbers) to users is assumed to be random and secret. But it may be possible to learn the user identification by monitoring transmissions and user behavior. To avoid both these problems, a scheme is termed herein (k,p)-immune if, for any adversary choosing adaptively a subset S of at most k users and a disjoint subset T, the following condition holds: the probability that the adversary (knowing all the secrets associated with S) guesses the value the center broadcasts to T is additively larger by at most p than the probability the adversary would have guessed it without knowing the secrets of S.

If the functions f are kept secret then the results for (k,p)-immune schemes are very similar to the results for (k,p)-random-resilient schemes. However, these results do not hold for all random-resilient schemes, since in the random constructions for both single level schemes and multi level schemes, described below, the process fixes the subset S and evaluates the probability that it is good for a random construction. Since the adversary does not know the values of the hash functions ($f_i$ for single level schemes) when adding a user to S, any choice of S has the same probability of being bad.

Another attack is possible, although difficult in practice. The adversary may attempt to actively subvert the system by publishing a solicitation for dishonest users that meet certain criteria. Specifically, it would be very useful for the adversary to capture pairs of devices that belong to the same 1-resilient R(i,j) scheme described above. If he captures 1 pairs $(a_i, b_i)$ such that $f_i(a_i)=f_i(b_i)$ then he has corrupted the scheme described above. In this case, a true k-resilient scheme is the only prevention. If k is sufficiently large and the number of traitors does not exceed k then the scheme is secure.

A multi-level system is described that converts a system with small resiliency to one with large resiliency. The system is based on a family of functions $f_1, \ldots, f_l, f_i:U \rightarrow \{1, \ldots, m\}$ and a collection of sets of schemes, $\{R(i,j) | 1 \leq i \leq l, 1 \leq j \leq m\}$, where each R(i,j) consists of l' schemes labeled R(i,j,1), ..., R(i,j,l'). These functions and schemes fulfill the following condition: For every subsets S⊂U of size k, there exists some 1≤i≤l such that for all 1≤j≤m there exists some 1≤$r_j$≤l' such that the scheme R(i,j,$r_j$) is resilient to the set $\{\chi \in S | f_i(\chi)=j\}$.

Such a structure can be used to obtain a k-resilient process as follows a) Generate independently chosen keys for all schemes R(i,j,r).

b) A user $\chi \in U$ receives for every 1≤i≤l and every 1≤r≤l' the keys associated with $\chi$ in scheme R(i, $f_i(\chi)$, r).

c) Given a set $T \subseteq U$ and a secret message M, the center generates:

Strings $M^1, \ldots, M^l$ such that $$\oplus_{i=1}^l M^i = M$$

and $M^1, \ldots, M^{l-1}$ are chosen at random.

For every $1 \leq i \leq l$, and $1 \leq j \leq m$ random strings $M_1^{(i,j)}, \ldots, M_{r'}^{(i,j)}$, such that $$\oplus_{t=1}^{r'} M_t^{(i,j)} = M^i.$$

d) The center broadcasts for all $1 \leq i \leq l$ and $1 \leq j \leq m$ and $1 \leq r \leq l'$ the message $M_r^{(i,j)}$ to the privileged subset $\{\chi \in T | f_i(\chi) = j\}$ using scheme R(i,j,r).

e) Every user $\chi \in T$ can obtain for all $1 \leq i \leq l$ and $1 \leq r \leq l'$ messages $M_r^{(i,f_i(\chi))}$. To reconstruct the message M, the user $\chi \in T$ takes the bitwise exclusive or of all messages transmitted to the user in all schemes to which the user belongs, i.e., in all schemes R(i,j,r) such that $f_i(\chi)=j$.

The number of keys associated with user $\chi$ is the number of keys associated with a scheme R(i,j,r) times $l \times l'$. The length of a broadcast is equal to the number of messages transmitted in an R(i,j,r) scheme times $l \times m \times l'$.

The system described above is k-resilient.

A two level system using this method is now described. In the foregoing example, $l=2k \log n$, $m=k/\log k$, $t=2e \log k$ and $l'=\log k+1$. The first level consists of a family of l functions $f_1, \ldots, f_l, f_i: U \to \{1, \ldots, m\}$. At the second level is function $g_r^{(i,j)}: U \to \{1, \ldots 2t^2\}$ for all $1 \leq i \leq l$, $1 \leq j \leq m$ and $1 \leq r \leq l'$. Every such (i,j,r) and $1 \leq h \leq 2t^2$ defines a 1-resilient scheme R(i,j,r,h) as in the one-level scheme described above. Every user $\chi$ receives the keys of schemes $R(i, f_i(\chi), r, g_r^{(i,f_i(\chi))}(\chi))$ for all $1 \leq i \leq l$ and $1 \leq r \leq l'$.

For a set $S \subseteq U$ of size k, i is "good" if for all $1 \leq j \leq m$

1. $|\{\chi \in S | f_i(\chi)=j\}| \leq t$.

2. there exists $1 \leq r \leq l'$ such that $g_r^{(i,j)}$ is 1-1 on $\{\chi \in S | f_i(\chi)=j\}$.

If for every set $S \subseteq U$ of size k there is a good i, the system is k-resilient.

Randomly chosen $f_i$ and $g_r^{(i,j)}$ provide a good system with reasonably high probability.

For a subset $S \subseteq U$ of size k and $j \in \{1 \ldots m\}$, the probability that the first condition above is not satisfied is at most $$\binom{k}{t} \cdot \left(\frac{1}{m}\right)^t \leq \left(\frac{ek}{2e \log k}\right)^{2e \log k} \cdot \left(\frac{\log k}{k}\right)^{2e \log k} =$$

$$\left(\frac{1}{2}\right)^{2e \log k} = \frac{1}{k^{2e}}$$

If condition 1 is satisfied, then for any $1 \leq r \leq l'$ the probability that $g_r^{(i,j)}$ is 1-1 on $\{\chi \in S | f_i(\chi)=j\}$ is at least $$1 - t\frac{1}{2t} = \frac{1}{2}.$$

Hence the probability that condition 2 is not satisfied is at most $\frac{1}{2}^{l'} = \frac{1}{2k}$ and therefore the probability that Conditions 1 and 2 are both satisfied for every $1 \leq j \leq m$ is at least $\frac{1}{2}$. The probability that no i is good for S is at most $\frac{1}{2}^l = 1/n^{2k}$. Hence the probability that all subsets $S \subseteq U$ of size k have a good i is at least $$1 - \binom{n}{k} \cdot \frac{1}{n^{2k}} \geq 1 - \frac{1}{n^k}.$$

This provides a k-resilient system in which each user stores $O(k \log k \log n \cdot w)$ keys and the center broadcasts $O(k^2 \log^2 k \log n)$ messages. This system Can be constructed effectively with high probability. For any $1 \leq k \leq n$ and $0 \leq p \leq 1$ there is a (k,p)-random-resilient scheme in which the number of keys each user stores $O(\log k \log(1/p) \cdot w)$ and the center broadcasts $O(k \log^2 k \log(1/p))$ messages. This the scheme can be constructed effectively with high probability.

The systems described herein are operative for all possible values of the parameters, however, examples are now provided for applications in which random resiliency suffices.

Example: A user group has one billion subscribers. The objective is to discourage any possible pirate box manufacturer, and thus the expectation is that he is required to capture k=100,000 devices before seeing any return on his investment.

A 1-resilient system is employed which is based on the number theoretic scheme described above. Using the randomized (100000, ½)-resilient system described above, the number of keys stored in each subscriber decryption device is less than 20, and the length of a broadcast enabling transmission is on the order of two million keys, which is much less than the one billion keys which are transmitted for standard schemes.

However, all subscribers would have to listen to one billion bits of set identification transmission without making a single error. In fact, the subscriber is apathic to the presence or absence of most of the users. It is only users that belong to the same underlying 1-resilient schemes that he belongs to that matter. Thus, there are advantages to splitting up users into independent broadcast encryption systems, determining what user gets assigned to what system at random. By appropriately resynchronizing and labeling schemes, the decryption device will only have to deal with the set identification transmission dealing with one (smaller) scheme.

There is a tradeoff between error control issues and security. If the number of broadcast encryption schemes gets too large, and the resiliency gets too small, then the (multiple) birthday paradox enters into consideration. Such a scheme is broken if any of its component broadcast encryption schemes is broken.

The billion users may be partitioned into randomly assigned broadcast encryption groups of 1000 users. A non-random 5-resilient broadcast encryption scheme may be employed which requires about 10 keys stored per user, and 100 keys transmission per broadcast encryption scheme, for a total of $10^8$ key transmissions. The total random resiliency is approximately $1,000,000^{5/6}=100,000$. The adversary randomly selects devices until he has 5 different devices from the same broadcast encryption scheme. Transmissions are 50 times longer than before, but still significantly shorter than individual transmissions. There is no longer any serious error control problem.

Another advantage of this last described system is that if the adversary is in fact successful, after collecting 100,000 decryption devices, then if one of the adversary eavesdropping devices is captured, all is not lost. It is still a relatively simple matter to disable all adversary devices by disabling one group of 1000 users, splitting these users amongst; other groups.

Reference is now made to FIGS. 1–5 which illustrate a generalized selective broadcasting system and some of the selective broadcasting methods described above.

FIG. 1 is a generalized block diagram of a selective broadcasting system. The system includes a broadcasting center 10 which broadcasts, via satellite, cable or other conventional equipment, to a population of subscribers, each of which is equipped with a television set 20, a conditional access module 30 and a decoder 40.

The apparatus of FIG. 1 may be operated using any of the selective broadcasting methods described herein. It is appreciated, however, that the selective broadcasting methods shown and described herein are also suitable for any other applications in which it is desired to selectively communicate a sequence of message data signals to a corresponding sequence of privileged subsets of individuals. For example, a first message data signal may need to be transmitted to a first subset 50 of users, a second message data signal may need to be transmitted to a second subset 60 of users, and a third message data signal may need to be transmitted to a third subset 70 of users.

According to a preferred embodiment of the present invention, a selective broadcasting method is employed to transmit a plurality of message data signals to a corresponding plurality of subscriber subsets within a subscriber population, the method comprising:

a. receiving an indication of a privileged set comprising an individual subset; and b. transmitting a message data signal from which a key can be extracted by members of the privileged set and cannot be extracted by any set of members outside the privileged set whose number of members is less than a predetermined resiliency. The length of the message data signal is less than the sum of lengths of the message data signals required if an individual message data signal is transmitted to each subscriber in the privileged set.

Further in accordance with a preferred embodiment of the present invention, the confidential information provided to each subscriber requires a certain memory size and at least one of the total subscriber memory size, for a privileged set of m subscribers, and the message data signal length are less than the subscriber memory size and message data signal length, respectively, required when $2^l$ keys are provided to each subscriber, where l is an integer, and m/l message data signals are used to transmit a common key to a privileged set having m members.

Preferred implementations of such selective broadcasting methods are now described with reference to FIGS. 2–5.

Figure 2:
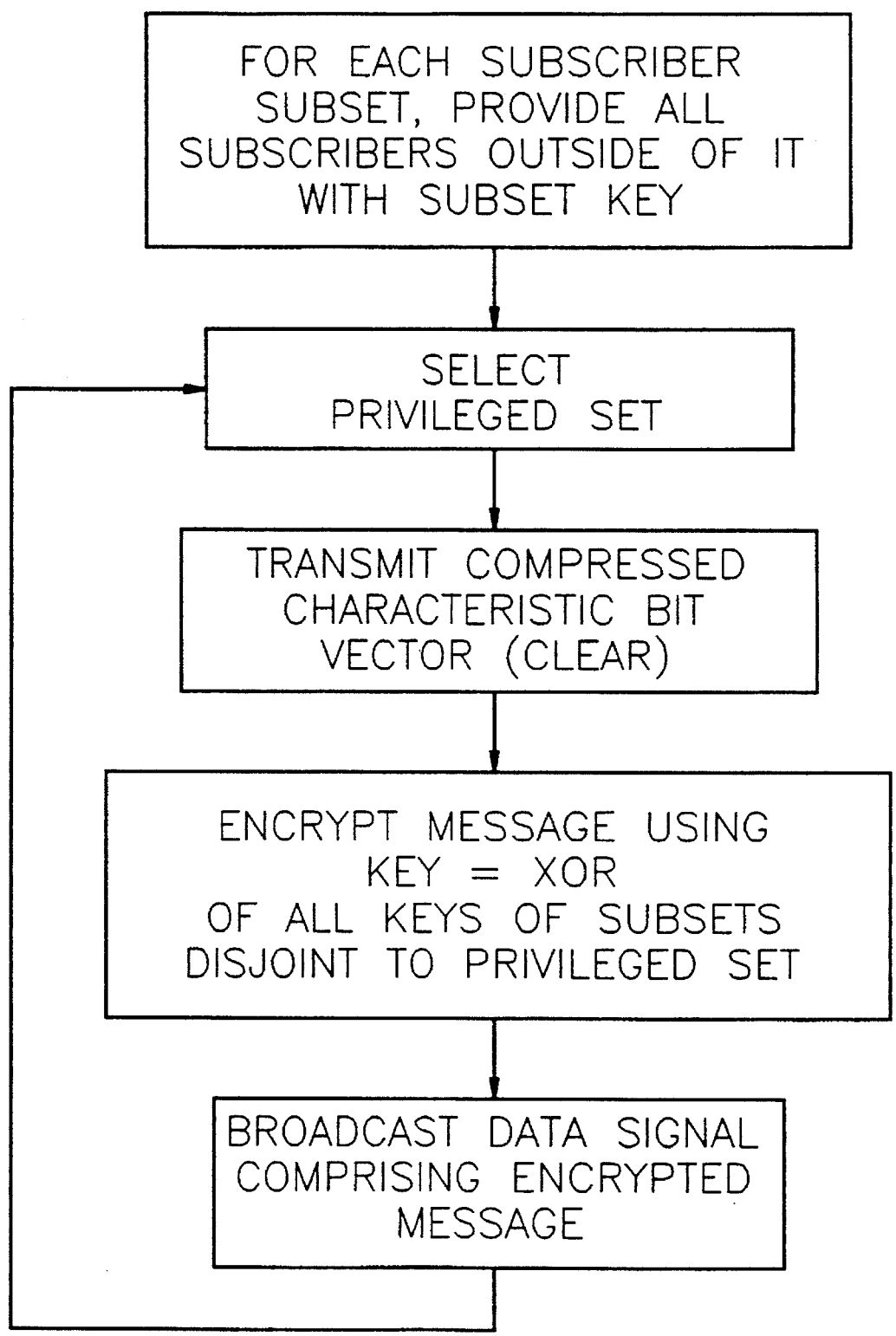
FIG. 2 is a simplified flowchart illustration of a selective broadcasting method provided in accordance with a preferred embodiment of the present invention.

FIG. 2 is a simplified flowchart illustration of a selective broadcasting method provided in accordance with a preferred embodiment of the present invention. The method of FIG. 2 comprises:

a. providing a set of keys respectively corresponding to the set of all possible subscriber subsets within an n-member subscriber population with less than a predetermined number k of members, wherein for each subset, the key corresponding thereto is provided only to those subscribers not belonging to the subset;

b. providing a message data signal; selecting from among the subscriber population a privileged set of subscribers which is to exclusively receive the message data signal; and transmitting information identifying the privileged set. The information identifying the privileged set typically comprises a characteristic bit vector, compressed using conventional bit vector compression methods. The term "receive" is intended to refer to the ability to obtain a message in a form that the receiving party is capable of comprehending.

The message data signal may, in television subscription applications, comprise all television programs offered during the subscription period. In pay-for-view applications, the message may comprise a single movie or television program. It is appreciated that the method of FIG. 2 is applicable generally to selective transmission situations and is not limited to TV broadcasting applications which are discussed in detail merely by way of example.

c. encrypting the message data signal using a key comprising the bitwise XOR of all keys corresponding to subsets which are disjoint to the privileged subset; and d. broadcasting a data signal comprising the encrypted message.

Figure 3:
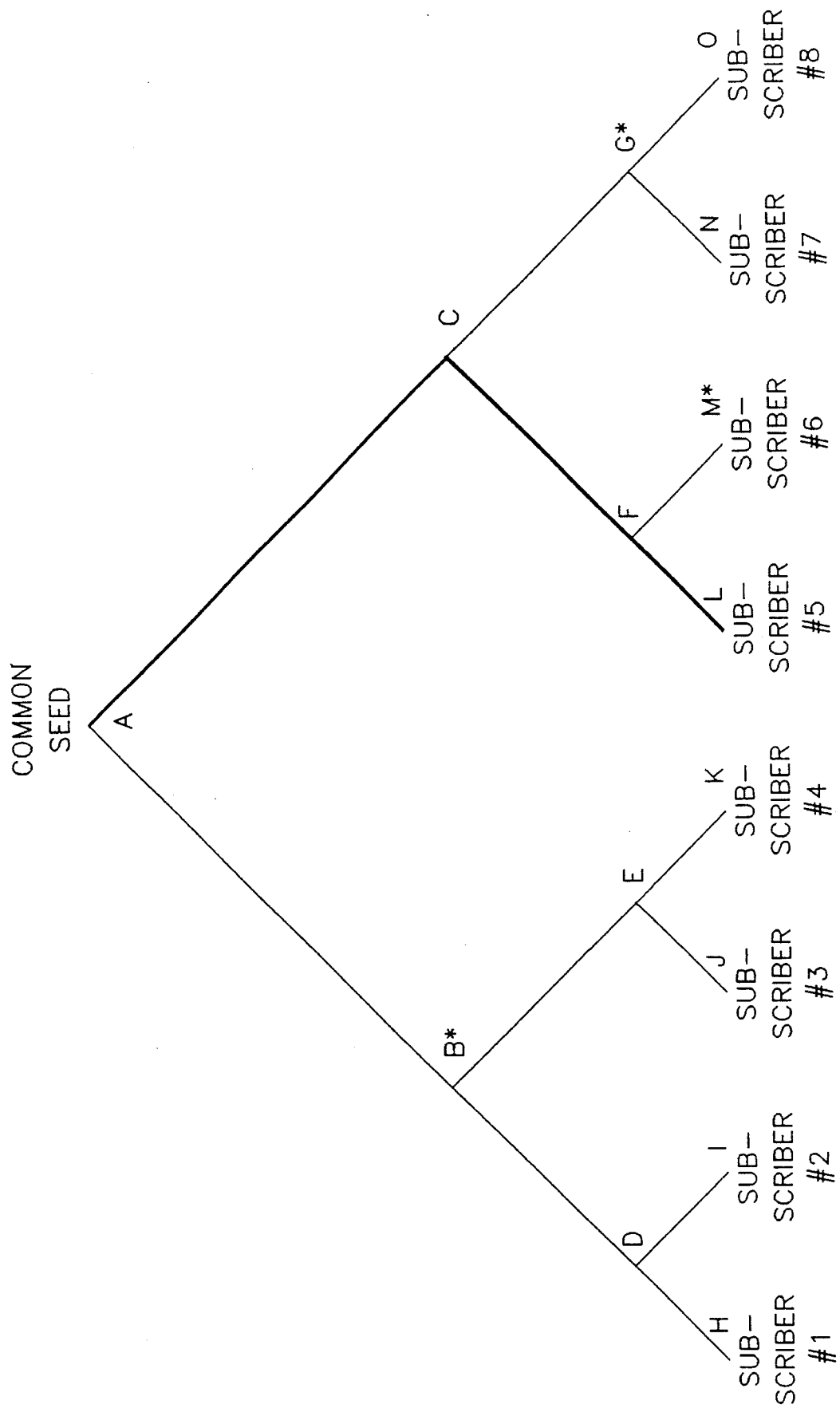
FIG. 3 is a diagram of a n-leaf balanced tree which is useful in understanding a preferred implementation of the key providing process of FIG. 1.

Preferably, the key providing process (a) comprises:

i. computing an n-leaf balanced binary tree, as illustrated in FIG. 3, characterized in that its root is labelled with a common seed and, for each vertex of the tree, the label of the root of its right subtree is the left half of the result of applying a pseudo random function to the vertex label and the label of the root of its left subtree is the right half of the result of applying a pseudo random function to the vertex label; and ii. providing each subscriber with the label of the root of each tree in a forest of trees resulting from removal from the balanced binary tree of a path extending from a leaf associated with the subscriber to the root.

In FIG. 3, the portion of the tree which is removed for subscriber #5 is marked in heavy lines. Once this tree portion is removed, the labels which are provided to subscriber #5 are the labels of nodes B, G and M. In the present specification, the terms "node" and "vertex" are used interchangeably. It is appreciated that FIG. 3 is a very small tree, suitable for a population of only 8 subscribers, which is presented herein only for the purposes of clarity of illustration. Also, the tree need not necessarily be binary and need not necessarily be entirely complete.

Figure 4:
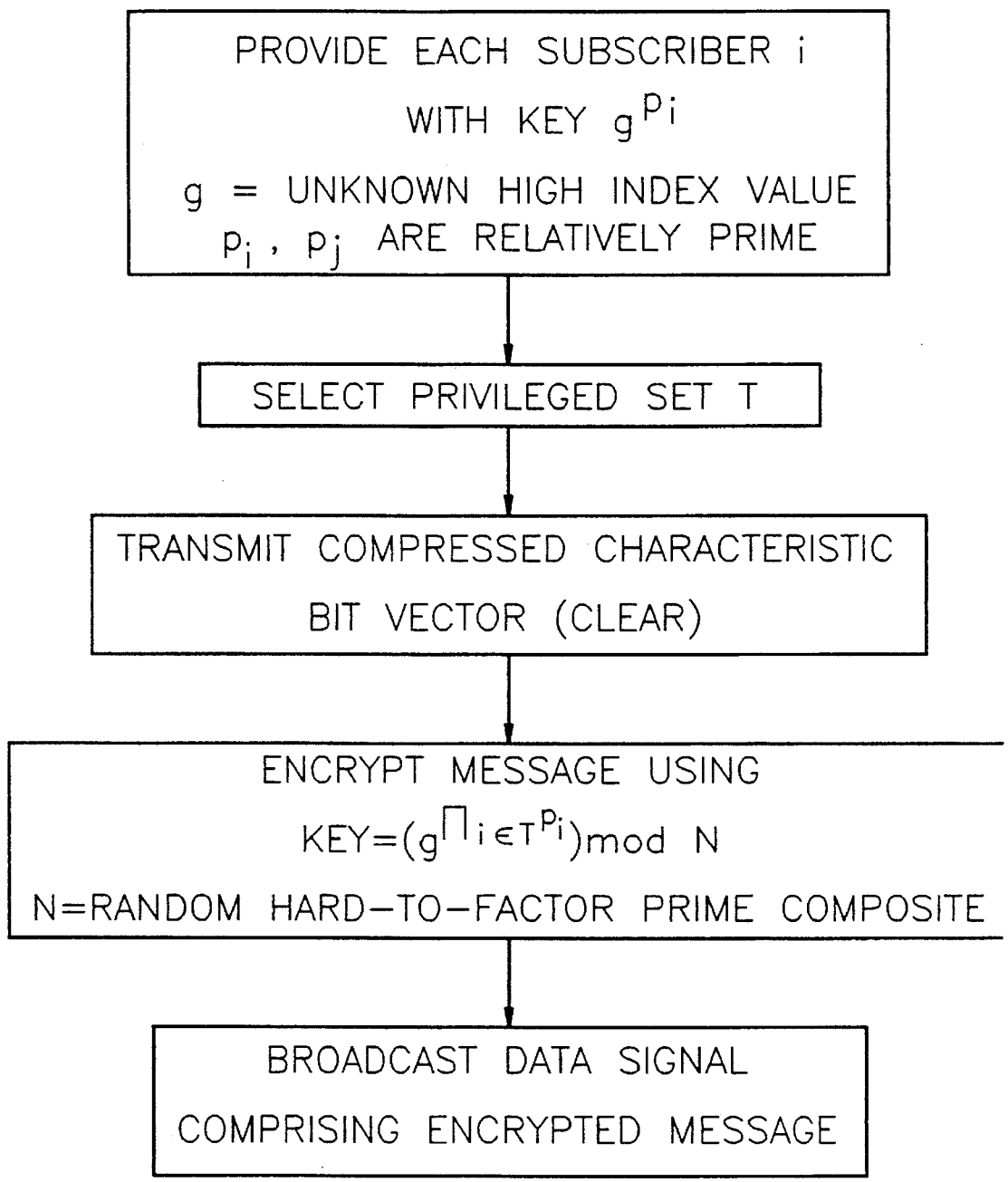
FIG. 4 is a simplified flowchart illustration of a selective broadcasting method provided in accordance with another preferred embodiment of the present invention.

FIG. 4 is a simplified flowchart illustration of a selective broadcasting method provided in accordance with another preferred embodiment of the present invention. The method of FIG. 4 preferably includes the following steps:

a. providing each subscriber i with a key, g to the power of $p_i$, where g is a high index value unknown to the subscribers and wherein the $p_i$ values are selected such that, for any two subscribers i and j, $p_i$ and $p_j$ are relatively prime;

b. providing a message data signal; selecting from among the subscriber population a privileged set of subscribers which is to exclusively receive the message data signal; and transmitting information identifying the privileged set. The information identifying the privileged set typically comprises a characteristic bit vector, compressed using conventional bit vector compression methods;

c. encrypting the message data signal using a key which is the modulo N value of g to the power of the product of the $p_i$ values of all subscribers i belonging to the privileged set, where N is a random hard to factor prime composite which is known to the subscribers; and d. broadcasting a data signal comprising the encrypted message.

Figure 5:
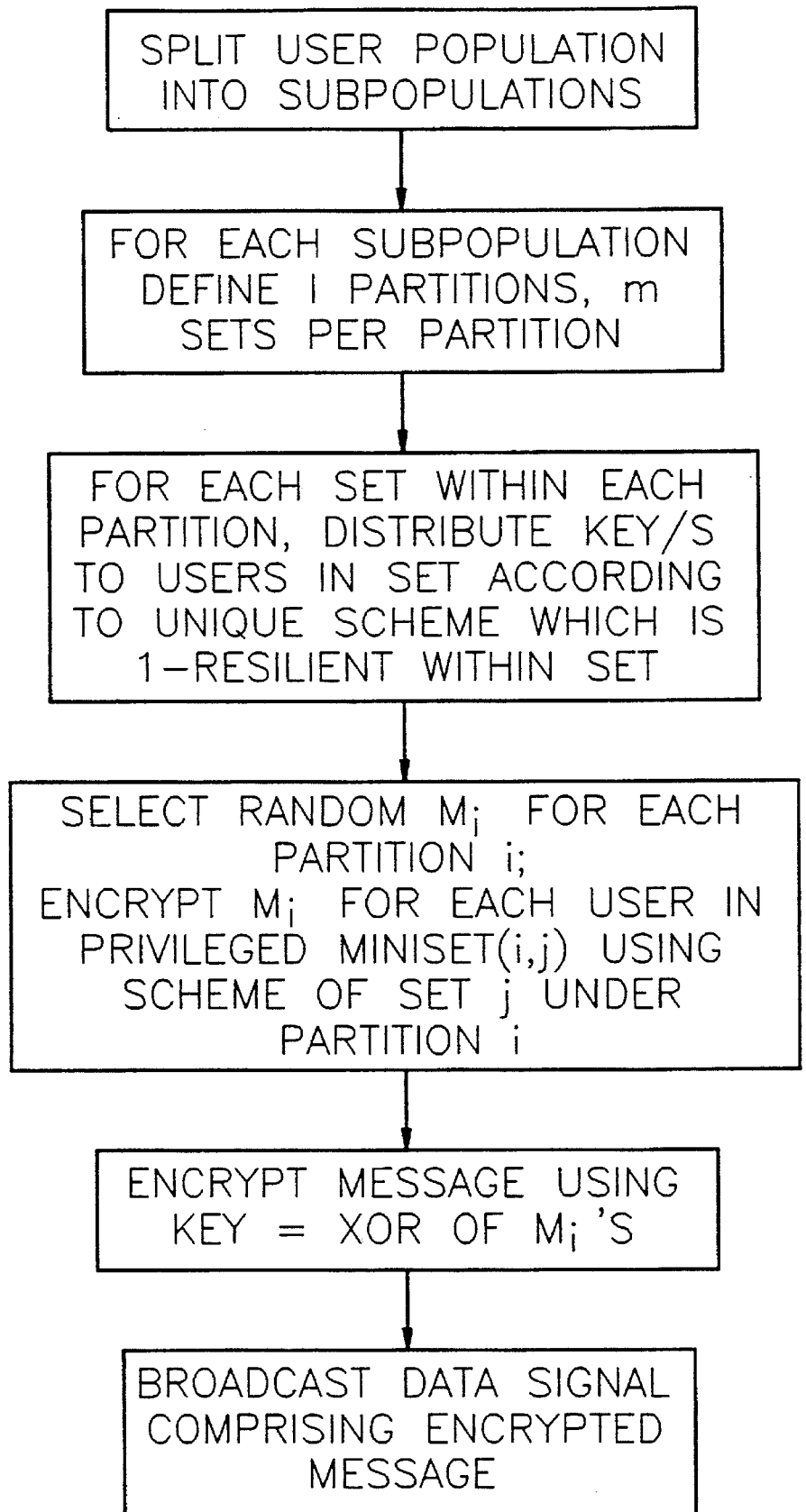
FIG. 5 is a simplified flowchart illustration of yet another selective broadcasting method provided in accordance with a preferred embodiment of the present invention.

FIG. 5 is a simplified flowchart illustration of yet another selective broadcasting method provided in accordance with a preferred embodiment of the present invention. The method of FIG. 5 preferably includes the following steps:

a. defining a plurality of l partitions of a population U of n subscribers, each partition comprising m subscriber sets;

b. for each partition and for each subscriber set within the partition, providing a unique scheme which is one-resilient within said set and distributing a key or keys to the subscribers in said subscriber set as indicated by the unique scheme.

For example, if the one-resilient scheme employed is the "forest" scheme of FIG. 3, each subscriber in the subscriber set gets log r keys, where r is the number of subscribers in the subscriber set. The log r keys are the labels of the roots of each tree in the forest of trees resulting from removal from the original tree of a path extending from the leaf associated with the subscriber to the root.

c. selecting a random value $M_i$ for each partition i (i=1 . . . l) and transmitting $M_1, \ldots, M_l$ such that only subscribers in the privileged set obtain all of $M_1, \ldots, M_l$ in understandable form. This is done as follows:

Each partition i partitions the privileged set into m privileged "minisets", termed herein privileged miniset (i,1), . . . , privileged miniset (i,m). $M_i$ is transmitted to the subscribers in privileged miniset (i,j) (j=1, . . . , m) using the scheme of set j under partition i;

d. transmitting a data signal comprising a message encrypted using a key which is the bitwise XOR of the $M_i$'s.

In step c, alternatively, l–1 $M_i$ values may be selected randomly whereas $M_l$ is selected such that the bitwise XOR of the $M_i$'s is M, the message data signal to be transmitted.

The 1-resilient (within the set) scheme employed in the method of FIG. 5 may be any of the 1-resilient schemes described above and particularly the schemes of FIGS. 2–4.

In the method of FIG. 5, l, the number of partitions, and m, the number of sets per partition, may be selected as follows:

m is at least $k^2$ where k is a predetermined resiliency value with probability p for a random set of k members;

l is at least log (1/p).

Alternatively, l and m may be selected as follows:

m is at least $2k^2$ where k is a predetermined resiliency value.

l is at least k log n.

The method of FIG. 5 may be performed on an entire population. Alternatively, the population may be split into a plurality of subscriber subpopulations and the method of FIG. 5 may be performed for each subpopulation. Similarly, the other methods shown and described herein may be performed on an entire population or may be performed on each of a plurality of subpopulations within the population.

A preferred conditional access system is now described which is particularly useful for TV broadcast encryption although its applicability is not limited to this type of situation. Subsequently, optional extensions are described which increase security at the cost of increasing the communications requirements. The foregoing description assumes, for the purposes of illustration, 10,000 groups of 511 users.

When a user joins the system, he gets a smartcard and an individual RSA key and is assigned to one of the 10,000 groups at random. Each user is given a unique serial number in the group that he belongs to, and is given 8 keys of 8 bytes each that allow him to compute 511 of the 512 keys that make up a group. Each group is thus a 1-resilient set.

The center stores the following information about each user: His public RSA key, the group he belongs to, and his serial number within this group.

For a pay-per-view transmission, or for a subscription renewal, the user file is scanned and a bit vector, with one bit per user, is constructed, where a 1 means that the user is to get the new key and a 0 means that the user is not to get the new key.

The resulting bit vector is scanned, and the following transmission is sent: group serial number, group characteristic vector, and the program/subscription key encrypted under the common key for the set of users that have a one in the appropriate location. The program/subscription key is 7 bytes long (56 bits), and is preferably padded with 3 bytes of zeros to ensure that errors are recognized immediately in the smartcard, thereby obviating the need for a CRC. The key and zero padding will be encrypted using a DES derived pseudo-one-time key pad, thus allowing the encrypted transmission to be any length, such as 10 bytes, rather than a multiple of 8.

The total transmission per group is thus at most 2 bytes for group identification, 64 bytes for the characteristic vector, if not compressed, and another 10 bytes for the encrypted key and redundancy check. This gives less than 1.2 bits per user.

Typically, only 1 in 30 users view a program, or 1 in 30 users have not paid up their subscription. In this case, the communications per group, using run length encoding of the characteristic vector, is less than 32 bytes, requiring less than 0.5 bits per user. These operations require less than one second on a smartcard.

In simple piracy attacks, one smartcard is copied. In some conventional systems, copying one smartcard allows the pirate to view everything that is transmitted to the group. In a pay-per-view system, the pirate, and all copies he makes, can view all pay-per-view programming without payment.

In the system shown and described herein, copying one smartcard allows all copies to view everything transmitted to the original copy, but this means that the original must continue payment. In a pay-per-view system the pirate must pay for all movies currently being transmitted, or else the other copies will be unable to view the programming.

In some conventional systems, if a pirate box is discovered, new smartcards must be sent to all users in the group. From the pirate box, the original smartcard that was used for manufacturing the pirate box cannot be discerned, and the pirate is therefore given a new smartcard. In theory, he could use this new card to manufacture new pirate boxes.

In the system shown and described herein, if a "simple" pirate box is discovered, then it uniquely identifies the original user from which the pirate box was created. Each user is uniquely identified by the keys he does not have. This means that legal action can be taken against a pirate. In particular, since a pirate must continue to pay for broadcasts, since otherwise the pirate boxes see nothing, the pirate cannot claim that this is a mistake or that his smartcard was stolen.

The goal of transmitting data to a subset of users has many applications including but not limited to various broadcast systems and television programming that is to reach a subset of subscribers. The primary goal of broadcast encryption systems is to be able to transmit information to a dynamically changing group of users, without repeating the message data signal for each and every member of the group. The users belonging to the group must be able to obtain a common encryption key, used to encrypt the bulk of the data.

An important problem which this invention seeks to solve is allowing a group of recipients to agree upon a common key, without allowing anyone that does not belong to the group to get this key. The invention has applications in many to many broadcast encryption, centralized broadcast encryption, interactive systems and non-interactive systems.

"Many to many broadcast encryption" refers to situations in which any user in a set of users can dynamically select a subset of users as the recipients of his encrypted transmissions. In some applications, only a central authority can set a common key with a subset of users.

An interactive system is one in which the members of the group first converse amongst themselves, and only then agree upon a common encryption key. Non-interactive systems are systems where only one member of the group need transmit data over the broadcast channel. Following this transmission, all members of the group addressed can compute a common key, and the message data signal itself can be encrypted under this key.

The present invention is particularly suited to centralized non-interactive systems, and specifically for pay-per-view applications. In these applications, there is no need for a user to talk with a subset of other users. Similarly, there is no mechanism for two way interaction, and thus a non-interactive system is employed. For example, a center may wish to broadcast a message data signal that is to be read by a select subset of users.

Due to an information theoretic lower bound, any transmission to a subset of users that allows these users, and no others, to obtain a common key, must be as least as long as the information theoretic bound on identifying a subgroup of users. Otherwise, there would be two different subgroups that are enabled (get a common key) via the same transmission.

For n users, there are $2^n$ subgroups, and thus at least n bits are required to identify a subgroup. While this is true on average, it is preferable to identify small groups with a relatively small transmission, whereas a relatively long transmission is acceptable if the receiving group is relatively large.

According to one embodiment of the present invention, the characteristic vector of the subgroup is run-length encoded. The advantage of this embodiment is that small groups are identified by a relatively small transmission.

No group of size k requires more than k log n bits, and a prefix code is preferably used so that if a large run of zeros and ones alternate with a frequency greater than 1/log n then the raw data (the characteristic vector itself) is transmitted. This means that all groups can be identified in O(n) bits, whereas no group of size k requires more than O(k log n) bits.

The goal of a broadcast encryption system is to approach the information theoretic lower bound from above. One possible broadcast encryption system is to transmit an individually encrypted message data signal to each member of the group, prefixed with the user identification. The length of such a transmission must be at least ks, where k is the number of users in the subgroup, and s is the length of the common key to be agreed upon. If k is a log n fraction of the total number of users, n, then this system requires O(ns) bits, exceeding the information theoretic lower bound by a factor of s.

For example: The minimal length of a secret key may be about s=50. The length of the DES key, for example, is 56 bits. Given a set of n=5,000,000 users, and a random subgroup of size k=1,000,000 that are to obtain a common key enabling them to view an encrypted broadcast transmission, the total number of bits to be transmitted by such a system is at least 50,000,000=ks. This does not include addressing information, on the order of k log n bits, however this overhead (10,000,000 bits) is small relative to the actual encrypted data being transferred.

The embodiment described above is suitable for applications in which the center and each user have previously agreed upon a common secret key to be used for the encryption of group key distribution messages.

An alternative implementation would be for each user to generate public and private keys. In this case, the center would use the user public key to encrypt the group key to the user. This embodiment has certain management advantages, however, the length of a transmission to a user is not s but rather is equal to the transmission length of a public key encrypted block, which could be significantly higher than s.

One extreme alternative to individual transmissions to each user is to give each user a key for each subset of users that he belongs to. If there are a total of n users, then each user belongs to a total of $2^{n-1}$ different subgroups of users. The center transmits the characteristic vector for the subgroup, and each user that belongs to the subgroup can obtain the common key for that subgroup. This system obtains the information theoretic lower bound for a broadcast encryption system. Returning to the example above, a total of 5,000,000 bits would be transmitted, describing the characteristic vector of the set, and nothing more.

A disadvantage of the above-described system is that the memory requirements are impractically large. For the example above, with n=5,000,000 users, each user would have to store $2^{4,999,999}$ different keys.

The problems facing broadcast encryption belong to two different categories:

1. Capture of a decryption device and possible duplication.

If this is not known to the center, any message data signal sent to the device will be decrypted. Since the system is non-interactive, there is no way to distinguish between the original device and its duplicates. This attack is possible for any non-interactive system.

2. A breakdown of the broadcast encryption system.

A breakdown may be more expensive than the simple duplication and may require the capture of many decryption devices. This means that message data signals, originally intended for other recipients, different from the devices captured, can also be read. In fact, there are many kinds of breakdown, as described hereinafter.

Each attack can be evaluated in terms of cost. While it may be possible to take apart a decryption device and produce exact duplicates, this may not be significant unless many such devices are produced. The cost associated with producing a single device that is capable of decrypting all message data signals transmitted to the original device is relatively high, and does not seem to be very useful unless several copies of such a device are made.

In some conventional systems, it may be possible to create pirate "boxes" that can view programming that is not a carbon copy of the programming viewed by one original user. This is a "breakdown" as defined above. One possible solution is to break up users into sets.

A message data signal is sent to the set of users, using a key common to all users in the set. Different sets have different keys. Additionally, each user has an individual key that can be used to transmit data to the user and to no one else. Either public key encryption or symmetric encryption systems may be used, although the use of public key schemes for the individual user keys has certain advantages, primarily in that the key directory itself does not need to be protected against theft.

If secret data is to be transmitted to any member of a set, the data is transmitted to the entire set using the set key. Additionally, a characteristic vector of those members of the set that are to obtain the data is transmitted. The hardware, which may, for example, comprise a smartcard, verifies that the user is entitled to receive the transmission and only then performs the decryption process. The characteristic vector is transmitted and authenticated using the set key.

If the set size is approximately equal to the number of bits in the secret key transmitted, then the overhead per transmission is a constant number of bits per user. The characteristic vector can be transmitted using run length encoding. This embodiment is close to the lower bound on any broadcast encryption system, and is efficient in terms of transmission size.

One problem is that if one smartcard has been taken apart, and the secret set key has been obtained, then any transmission destined for the set can be decrypted.

If many pirate boxes are manufactured, and such a box is obtained by security personnel, the set must be deleted. The legitimate users in the set can be moved to other sets by using their individual keys to encrypt information about the new set, such as the new set key.

It is possible to identify the original user who was the source of the breakdown by using the individual keys to transmit new set keys, over time. For example, once a month each set may change its set key. The new set key is transmitted to all users in the set using their individual keys. This means that the pirate boxes must also contain the individual key of the original user. Thus, the original user whose smartcard was the source of all these pirate boxes can be traced.

The above-described system has the advantage that, if pirate boxes are manufactured and caught, it is relatively easy to destroy them while continuing to supply services to legitimate customers.

A disadvantage of the above-described system is that if a single decryption device has been broken, The pirate is able to manufacture other pirate boxes and to view all pay-per-view transmissions without paying for any of them.

A scheme is called t-resilient if the contents of at least t+1 different decryption devices, belonging to the same set, must be known before the scheme can be broken.

The system described above is therefore 0-resilient, since it suffices to obtain one decryption device and then all transmissions can be read to anyone in the set.

If the system were 1-resilient, it would not suffice to break open one decryption device (smartcard). This would merely allow the pirate to decrypt message data signals destined to the Specific user whose decryption device has been broken into. This would not allow the pirate to view pay-per-view programs that he had not paid for. The pirate also would not be able to manufacture pirate boxes that are not exact copies of this user.

For a 1-resilient system, a pirate would have to obtain 2 decryption devices that belong the same set in order to view pay-per-view programming that has not been paid for. For a t-resilient system, a pirate would have to obtain t+1 decryption devices. In fact, for an appropriate choice of t, the secret user information could be stored on a memory device, and all computations could be performed in the decoder, without significant loss of security.

A preferred implementation of the above-mentioned "basic" system is now described which has relatively large memory requirements, although these memory requirements can be substantially reduced. In the foregoing discussion, t is used to represent the resilience.

As described above, for n users, c(n,t) keys, k(1), k(2), . . . , k(c(n,t)) are randomly selected, where:

$$c(n,t) = \sum_{i=0}^{t} (n!/[(n-i)! \, i!]),$$

the number of different sets of size i that can be selected from a ground set of size n.

The value c(n,t) is the number of different sets of size greater or equal to 0 and less than or equal to t. The characteristic vectors of these sets have at most t ones in them.

S(j) is a set of size r (0<=r<=t) associated with key k(j). Each user gets keys k(j), for each subset S(j) that the user does not belong to.

Associated with each subset of users S is a group key that is the exclusive or of all keys k(j) such that the intersection between S and S(j) is empty. I.e., the common key for a set S is:

k(S)=XOR [k(j)], where the XOR is taken over all 1<=j<=c (n,t) for which the intersection of S(j) with S is empty.

Each user that belongs to the set S can compute this key, but no user that does not belong to S can because he is missing some of the keys. In fact, no group of users of size less than or equal to t can compute the key if none of the t users belong to the set S. If a pirate has taken apart t decryption devices $i_1, i_2, \ldots, i_t$, there is some key S(j) that is associated with the set of these t users. None of these users has a copy of this key, and each transmission to a set S that has an empty intersection with S(j) depends upon the missing key.

EXAMPLE 1

For a set of n=63 users, a t=1 resilient system involves c(n,t)=1+63=64 keys. In other words, each user gets a set of 63 different keys. All users have the key associated with the empty set, and each user has exactly one other key that he does not have. User j is missing the key associated with the set {j}.

EXAMPLE 2

For a set of n=63 users, a t=2 resilient system involves c(n,t)=1953+63+1=2017 keys. Each user is missing 63 of these keys. User i is missing the key associated with sets of size less than or equal to 2 that contain i. There is exactly one set of size one that contains i, i.e. the set {i} itself. There are 62 sets of size 2 that contain i (the sets {i,j}, where i is not equal to j.

The memory requirements for the t-resilient system described above may be large. For constant t, the number of keys in the system is $O(n^t)$. However, as described above with reference to FIG. 3, this can be improved by generating the keys associated with the different sets by using a cryptographic one way hash function. If t=1, the system described above requires n+1 different keys, and each user is assigned n of these keys.

S(j), where 1<=j<=n, denotes the set {j}. S(n+1) denote the empty set. The appropriate key k(j) is generated by a cryptographic process as follows:

f is a one way function that takes s bits and maps them into 2s bits. A binary tree of depth log(n+1), with n+1 leaves, is constructed. A tree is selected which is a full binary tree, except, possibly, for some missing leaves on the right in the last level. The root is labelled with a random string r, and the left and right children of an internal node v are respectively labelled with the leftmost s bits and the rightmost s bits of f applied to the label on v. The keys k(1), . . . , k(n+1) are the labels of the leaves of the tree. As f is publicly known, all keys k(1), . . . , k(n+1) can be constructed by knowing only r.

If a user is given the root label r, he has effectively been given all keys. What is desired is to give the user all keys except for the key associated with the set that contains him alone. To do this, the path from a specific leaf to the root in the tree is removed, leaving a forest of log n binary trees. Giving the user the roots of these log n keys allows the user to compute exactly the keys that he is supposed to know, and no others.

A similar construction may be employed for the case of t=2 except that, here, the keys are viewed as being the leaves of a tree of trees, and n log n labels suffice to allow the user to compute exactly those keys that he is supposed to know, and no others.

EXAMPLE 1

To obtain a 1-resilient system for 63 users, all that is required per user are 6 bit strings of length s.

EXAMPLE 2

To obtain a 2-resilient system for 63 users, all that is required per user are 370 bit strings of length s.

A practical function f that is easy to compute for s=64 is to take the DES encryption of the argument l, under two different argument-derived keys, as the left and right halves of f(l). For example, two random constants c and k may be generated, and f(l) may be the concatenation of $DES_{l\ XOR\ c}$ (l) and $DES_{l\ XOR\ k}$ (l).

There are also randomized constructions for the sets S(j), in which not all subsets of size <=t are taken. These randomized constructions work well when the sets of users that have been compromised is selected at random. These constructions require fewer sets and thus less memory. Another possibility is to protect only some transmissions, such that, possibly, some transmissions would be revealed. In the context of pay-TV, a randomly behaving pirate box is as good as no pirate box at all, which allows memory to be saved.

An example of a practical application of the embodiments described above is as follows:

Users may be split into groups of size 63. A 2-resilient scheme may be employed on the 63 users, and new users may be added at random to one of 100,000 groups. This accomodates a total of 6,300,000 users. DES may be used as the basis for group transmissions, and RSA be used for individual user keys should the need arise. This means that the security parameter, s, is 56.

The total transmission size, to enable any subset of the group of 63 to view the programming, is therefore 63+56= 119 bits. Optionally, the message data signal may be prefixed with the group serial number, requiring another 17 bits per group transmission. The total transmission cost per user is approximately 2 bits.

To break the system, a pirate needs to break open many smartcards until he finds 3 different smartcards that belong to the same group. This is probabilistically similar to an experiment where balls are tossed into a set of 100,000 bins until there is one bin with 3 balls in it. This requires tossing $100,000^{2/3}$=2,000 different balls and means that the pirate will have to break open over 2,000 different smartcards before he is able to compromise one group of 63. If this happens, and such a pirate box is found, the administration merely transmits the new secret data to the 60 legitimate users that remain in the group, and moves them to new groups using the individual user keys.

As described above for the simplest scheme, each group preferably undergoes a migration process periodically, changing all the keys in the broadcast encryption system once every period. The new keys may be transmitted using the individual user RSA keys. As a result, any piracy attempt is either for a very short while, or the capture of any pirate box will identify the original smartcards broken into. The total communications required for the migration process is on the order of the data transmissions for pay-per-view.

In the particular embodiment discussed herein, for a pirate to view programming that has not been paid for, the number of smartcards that have to be broken up may exceed 2,000, and the piracy is easily dealt with. Additionally, the discovery of any pirate box will lead to the guilty parties.

The system is based upon the random assignment of users to sets of, typically, size 63, although this need not be the case, where each set is associated with a 2-resilient broadcast encryption scheme. Each user is also associated with a personal RSA key, and the public key for the user is stored at the center. Over time, the broadcast encryption schemes change, and the personal RSA keys are used to transmit the appropriate new scheme values to the users.

It is appreciated that any software components of the present invention may, if desired, be implemented in ROM (read-only memory) form. The software components may, generally, be implemented in hardware, if desired, using conventional techniques.

It is appreciated that various features of the invention which are, for clarity, described in the contexts of separate embodiments may also be provided in combination in a single embodiment. Conversely, various features of the invention which are, for brevity, described in the context of a single embodiment may also be provided separately or in any suitable subcombination.

It will be appreciated by persons skilled in the art that the present invention is not limited to what has been particularly shown and described hereinabove. Rather, the scope of the present invention is defined only by the claims that follow:

I claim:

1. A selective broadcasting method operative to transmit a plurality of message data signals to a corresponding plurality of subscriber subsets within a set of subscribers, the method comprising:

receiving an indication of a privileged set comprising an individual subset; and transmitting a message data signal from which a key can be extracted by members of the privileged set and cannot be extracted by any set of members outside the privileged set whose number of members is less than a predetermined resiliency, wherein the length of the message data signal is less than the sum of lengths of the message data signals required if an individual message data signal is transmitted to each subscriber in the privileged set.

2. A selective broadcasting method operative to transmit a plurality of message data signals to a corresponding plurality of subsets within a set of subscribers, the method comprising:

receiving an indication of a privileged set comprising an individual subset;

providing each subscriber with confidential information to be stored which requires a certain memory size;

transmitting a message data signal from which a key can be extracted by members of the privileged set and cannot be extracted by any set of members outside the privileged set whose number of members is less than a predetermined resiliency, wherein at least one of the total subscriber memory size, for a privileged set of m subscribers, and the message data signal length are less than the subscriber memory size and message data signal length, respectively, required when $2^l$ keys are provided to each subscriber, where l is an integer, and m/l message data signals are used to transmit a common key to a privileged set having m members.

3. A selective broadcasting method for broadcasting to a privileged set of subscribers from among a population of n subscribers, the method comprising:

providing a set of keys respectively corresponding to the set of all possible subscriber subsets within the subscriber population with less than a predetermined number k of members, wherein for each subset, the key corresponding thereto is provided only to those subscribers not belonging to the subset;

providing a message data signal and selecting from among the subscriber population a privileged set of subscribers which is to exclusively receive the message data signal, and transmitting information identifying the privileged set;

encrypting the message data signal using a key comprising the bitwise XOR of all keys corresponding to subsets which are disjoint to the privileged set; and broadcasting a data signal comprising the encrypted message.

4. A method according to claim 3 wherein said key providing process comprises:

computing an n-leaf balanced binary tree characterized in that its root is labelled with a common seed and, for each vertex of the tree, the label of the root. of its right subtree is the left half of the result of applying a pseudo random function to the vertex label and the label of the root of its left subtree is the right half of the result of applying a pseudo random function to the vertex label; and providing each subscriber with the label of the root of each tree in a forest of trees resulting from removal from the balanced binary tree of a path extending from a leaf associated with the subscriber to the root.

5. A selective broadcasting method for broadcasting to a privileged set of subscribers from among a population of subscribers, the method comprising:

providing each subscriber i with a key g to the power of $p_i$ where g is a high index value unknown to the subscribers and wherein the $p_i$ values are selected such that, for any two subscribers i and j, $p_i$ and $p_j$ are relatively prime;

providing a message data signal and selecting from among the subscriber population a privileged set of subscribers which is to exclusively receive the message data signal, and transmitting information identifying the privileged set;

encrypting the message data signal using a key which is the modulo N value of g to the power of the product of the $p_i$ values of all subscribers i belonging to the privileged set, where N is a random hard to factor prime composite which is known to the subscribers; and broadcasting a data signal comprising the encrypted message.

6. A selective broadcasting method for broadcasting to a privileged set of subscribers from among a population U of n subscribers, the method comprising:

defining a plurality of l partitions of the population of subscribers, each partition comprising m subscriber sets;

for each partition and for each subscriber set within the partition, providing a unique scheme which is one-resilient within said set and distributing keys to the subscribers in said subscriber set as indicated by the unique scheme;

providing a value $M_i$ for each partition i (i=1, ..., l), at least some of which values are random;

for each partition i and for each set j (j=1, ..., m) within partition i, transmitting $M_i$ to all privileged subscribers in set j using the scheme of set j under partition i; and transmitting a message data signal in encrypted form using a key which is the bitwise XOR of the $M_i$'s.

7. A selective broadcasting method for broadcasting to a privileged set of subscribers from among a population U of n subscribers, the method comprising:

defining a plurality of l partitions of the population of subscribers, each partition comprising m subscriber sets;

for each partition and for each subscriber set within the partition, providing a unique scheme based on the method of claim 3 which is one-resilient within said set and distributing keys to the subscribers in said subscriber set as indicated by the unique scheme;

providing a value $M_i$ for each partition i (i=1, ..., l), at least some of which values are random;

for each partition i and for each set j (j=1, ..., m) within partition i, transmitting $M_i$ to all privileged subscribers in set j using the scheme of set j under partition i; and transmitting a message data signal in encrypted form using a key which is the bitwise XOR of the $M_i$'s.

8. A selective broadcasting method for broadcasting to a privileged set of subscribers from among a population U of n subscribers, the method comprising:

defining a plurality of l partitions of the population of subscribers, each partition comprising m subscriber sets;

for each partition and for each subscriber set within the partition, providing a unique scheme based on the method of claim 4 which is one-resilient within said set and distributing keys to the subscribers in said subscriber set as indicated by the unique scheme;

providing a value $M_i$ for each partition i (i=1, ..., l), at least some of which values are random;

for each partition i and for each set j (j=1, ..., m) within partition i, transmitting $M_i$ to all privileged subscribers in set j using the scheme of set j under partition i; and transmitting a message data signal in encrypted form using a key which is the bitwise XOR of the $M_i$'s.

9. A selective broadcasting method for broadcasting to a privileged set of subscribers from among a population U of n subscribers, the method comprising:

defining a plurality of l partitions of the population of subscribers, each partition comprising m subscriber sets;

for each partition and for each subscriber set within the partition, providing a unique scheme based on the method of claim 5 which is one-resilient within said set and distributing keys to the subscribers in said subscriber set as indicated by the unique scheme;

providing a value $M_i$ for each partition i (i=1, ..., l), at least some of which values are random;

for each partition i and for each set j (j=1, ..., m) within partition i, transmitting $M_i$ to all privileged subscribers in set j using the scheme of set j under partition i; and transmitting a message data signal in encrypted form using a key which is the bitwise XOR of the $M_i$'s.

10. A method according to claim 6 wherein l, the number of partitions, and m, the number of sets per partition, are selected as follows:

m is at least $k^2$ where k is a predetermined resiliency value with probability p for a random set of k members;

l is at least log (1/p).

11. A method according to claim 6 wherein l, the number of partitions, and m, the number of sets per partition, are selected as follows:

m is at least $2 k^2$ where k is a predetermined resiliency value l is at least k log n.

12. A method according to claim 1 and also comprising splitting the subscriber population into a plurality of subscriber subpopulations and performing the above methods separately for each subpopulation.

13. A method according to claim 12 wherein each subpopulation comprises approximately 1000 subscribers.

14. A method according to claim 12 wherein each subpopulation comprises 63 subscribers.

15. A method according to claim 12 wherein there are approximately 100,000 subpopulations.

16. A selective broadcasting system operative to transmit a plurality of message data signals to a corresponding plurality of subscriber subsets within a set of subscribers, the system comprising:

encrypting and broadcasting equipment operative to transmit a message data signal from which a key can be extracted by members of a privileged set and cannot be extracted by any set of members outside the privileged set whose number of members is less than a predetermined resiliency, wherein the length of the message data signal is less than the sum of lengths of the message data signals required if an individual message data signal is transmitted to each subscriber in the privileged set.

17. A selective broadcasting system operative to transmit a plurality of message data signals to a corresponding plurality of subsets within a set of subscribers, the system comprising:

a subscriber memory loaded with confidential information occupying a certain memory size;

broadcasting equipment operative to transmit a message data signal from which a key can be extracted by members of a privileged set and cannot be extracted by any set of members outside the privileged set whose number of members is less than a predetermined resiliency, wherein at least one of the total occupied subscriber memory size, for a privileged set of m subscribers, and the message data signal length are less than the subscriber memory size and message data signal length, respectively, required when $2^l$ keys are provided to each subscriber, where l is an integer, and m/l message data signals are used to transmit a common key to a privileged set having m members.

18. A selective broadcasting system for broadcasting to a privileged set of subscribers from among a population of n subscribers, the system comprising:

n subscriber memories storing a set of keys respectively corresponding to the set of all possible subscriber subsets within the subscriber population with less than a predetermined number k of members, wherein for each subset, the key corresponding thereto is stored only by those subscribers not belonging to the subset;

an encryptor operative to encrypt a message data signal intended for a privileged set using a key comprising the bitwise XOR of all keys corresponding to subsets which are disjoint to the privileged set; and broadcasting equipment operative to broadcast information identifying the privileged set and a data signal comprising the encrypted message.

19. A selective broadcasting system for broadcasting to a privileged set of subscribers from among a population of subscribers, the system comprising:

a plurality of subscriber memories associated respectively with the subscribers, wherein the i'th subscriber memory associated with subscriber i stores a key g to the power of $p_i$ where g is a high index value unknown to the subscribers and wherein the $p_i$ values are selected such that, for any two subscribers i and j, $p_i$ and $p_j$ are relatively prime;

encrypting a message data signal intended for a privileged set of subscribers using a key which is the modulo N value of g to the power of the product of the $p_i$ values of all subscribers i belonging to the privileged set, where N is a random hard to factor prime composite which is known to the subscribers; and broadcasting equipment operative to broadcast information identifying the privileged set and a data signal comprising the encrypted message.

20. A selective broadcasting system for broadcasting to a privileged set of subscribers from among a population U of n subscribers, the system comprising:

n subscriber memories associated with the n subscribers respectively, wherein for each of a plurality of l partitions of the population of subscribers, each partition comprising m subscriber sets and for each subscriber set within the partition, keys distributed according to a unique scheme which is one-resilient within said set are stored in the memories of all subscribers in said subscriber set, broadcasting apparatus operative, for each partition i and for each set j (j=1, ..., m) within partition i, to transmit an $M_i$ signal to all privileged subscribers in set j using the scheme of set j under partition i, wherein at least some of the $M_i$ signals are random, the broadcasting apparatus also being operative to transmit a message data signal in encrypted form using a key which is the bitwise XOR of the $M_i$'s.

* * * * *

UNITED STATES PATENT AND TRADEMARK OFFICE
CERTIFICATE OF CORRECTION

PATENT NO. : 5,592,552
DATED : January 7, 1997
INVENTOR(S) : Amos FIAT

It is certified that error appears in the above-indentified patent and that said Letters Patent is hereby corrected as shown below:

TITLE PAGE

Item "[22] Filed:"  change "Sep. 24, 1994" to -- Aug. 24, 1994 --

Signed and Sealed this

Ninth Day of September, 1997

Attest:

BRUCE LEHMAN

Attesting Officer

Commissioner of Patents and Trademarks